(12) United States Patent
Chen et al.

(10) Patent No.: US 6,797,983 B2
(45) Date of Patent: Sep. 28, 2004

(54) METHOD OF FABRICATION LCOS STRUCTURE

(75) Inventors: Ralph Chen, Taichung (TW); Marcus Yang, Chang-Hua (TW); Yuan-Li Tsai, Taipei (TW); Ching-Chun Huang, Taichung (TW); Sheng-Hsiung Yang, Hsin-Chu (TW)

(73) Assignee: United Microelectronics Corp., Hsin-Chu (TW)

( * ) Notice: Subject to any disclaimer, the term of this patent is extended or adjusted under 35 U.S.C. 154(b) by 151 days.

(21) Appl. No.: 10/060,460

(22) Filed: Jan. 30, 2002

(65) Prior Publication Data

US 2003/0143768 A1 Jul. 31, 2003

(51) Int. Cl.⁷ .......................... H01L 21/00; H01L 29/04
(52) U.S. Cl. .................. 257/59; 257/52; 257/57; 257/72; 257/258; 438/30; 438/29; 438/623; 438/626
(58) Field of Search .................. 257/59, 52, 57, 257/258, 443, 72, 347, 749, 88; 438/30, 29, 155, 623, 626, 631, 723, 780

(56) References Cited

U.S. PATENT DOCUMENTS

| | | | | |
|---|---|---|---|---|
| 5,566,010 A | * | 10/1996 | Ishii et al. | 359/59 |
| 5,867,134 A | * | 2/1999 | Alveda et al. | 345/8 |
| 5,966,190 A | * | 10/1999 | Dohjo et al. | 349/39 |
| 6,181,398 B1 | * | 1/2001 | Libsch et al. | 349/113 |

* cited by examiner

Primary Examiner—Matthew Smith
Assistant Examiner—Igwe U. Anya
(74) Attorney, Agent, or Firm—Merchant & Gould P.C.

(57) ABSTRACT

A method is provided to fabricate a LCOS back plane structure. The present invention utilized a HV device such as HV CMOS transistor (high voltage complementary metal oxide semiconductor transistor) and a HV capacitor layer are applied to the substrate. Furthermore, the HV capacitor layer has a higher dielectric layer and coupling ratio to sustain the higher operating voltage, such that the operating capacitance can be raised. Moreover, the HV CMOS transistor is combined with a mirror layer which has a higher reflective property, such that the LCOS back-plate structure has the better contrast and chrominance output in per area unit, when the operating voltage range is increased.

33 Claims, 6 Drawing Sheets

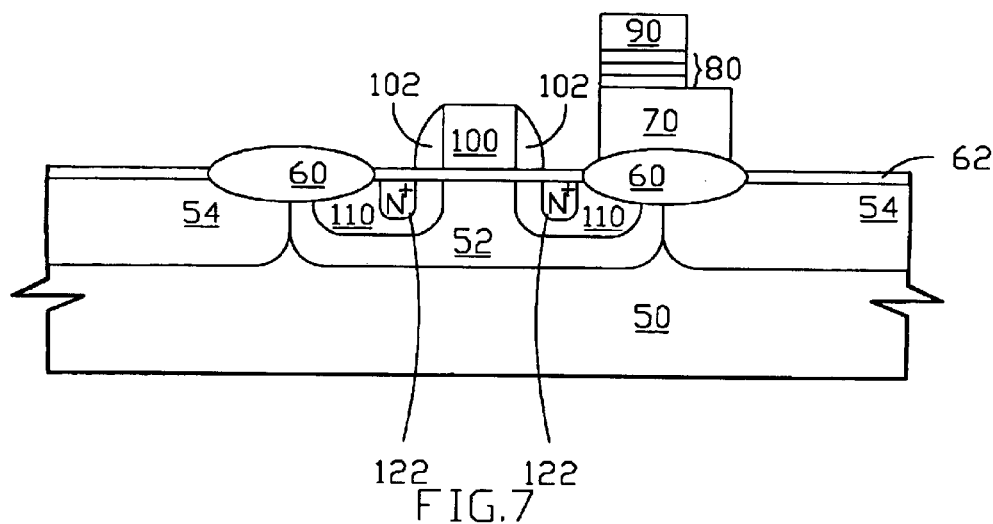
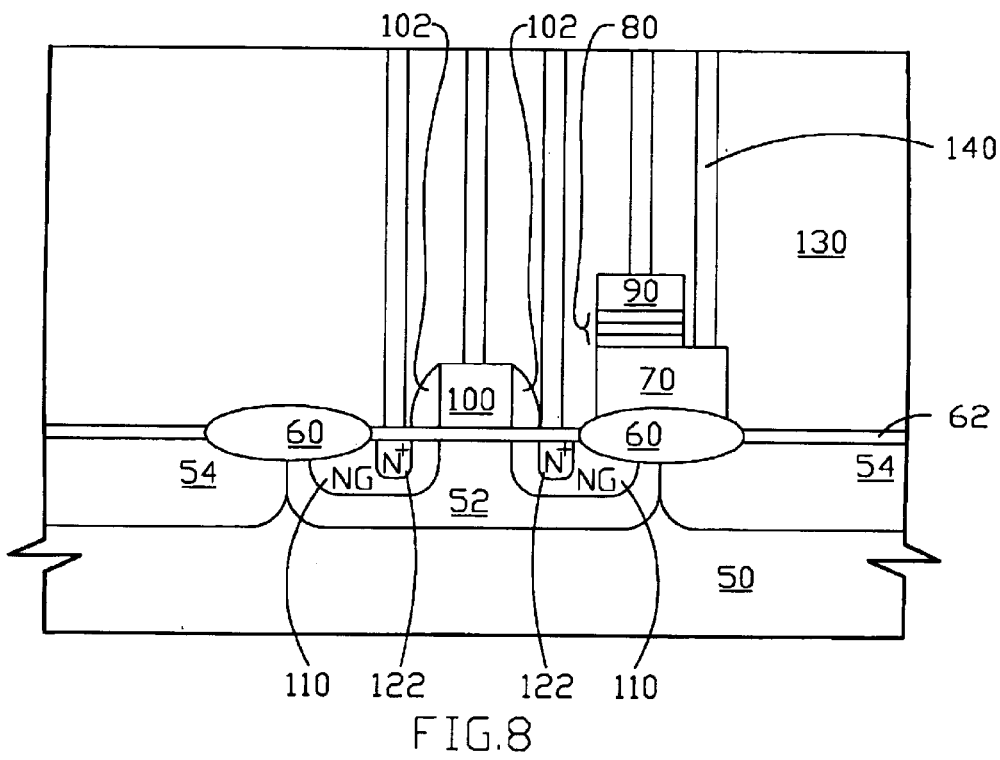

METHOD OF FABRICATION LCOS STRUCTURE

BACKGROUND OF THE INVENTION

1. Field of the Invention

The present invention generally relates to a method for fabricating a LCOS (liquid crystal on silicon) back plane, and more particularly to a method for fabricating a LCOS back plane structure, and application for the multimedia projector.

2. Description of the Prior Art

The CMOS (complementary metal oxide semiconductor) back plane of LCOS (liquid crystal on silicon) is an important electric device for the micro-display device.

In generally, the CMOS back plane structures constituted by LV CMOS transistor (low voltage complementary metal oxide semiconductor transistor) and an oxide capacitor layer. In the prior process for LV device, an oxide layer severs as a capacitor layer. Because the oxide layer merely sustains the low operating-voltage to limit the operating-voltage range, wherein the operating-voltage is under 5 volts. As if increasing the operating voltage, the area of the oxide capacitor layer is increased to sustain the higher voltage. However, the increased area of the oxide capacitor layer will increase the area the area of the integrated circuits. Therefore, the purpose of the semiconductor device has been densely integrated progressively, the element structure has been minimized cannot be achieved.

Furthermore, the oxide capacitor layer cannot sustain the higher voltage when increasing the operating voltage. After the operating voltage to the oxide capacitor layer during a period time, because the coupling ratio of the oxide capacitor layer is small, such that the breakdown of the oxide capacitor layer will be caused to lead the leakage current and the reliability of the integrated circuit will be reduced.

SUMMARY OF THE INVENTION

In accordance with the present invention, a method is provided for fabricating a HV CMOS transistor (high voltage complementary metal oxide semiconductor transistor) back plane structure that substantially obtains the large operating voltage range and large operating capacitance range. This method essentially utilize a HV device is applied on the substrate, such that the LCOS (liquid crystal on silicon) back plane structure can obtain the large operating voltage and the HV device can cooperate with the HV capacitor layer that can sustain the higher operating voltage, and further generates the better capacitance operating range. Therefore, the LCOS back plane structure has the better contrast and the chrominance output in per area unit.

It is one object of this invention is that a HV device is applied to the substrate to obtain large operating voltage and better capacitance operating range.

It is another object of this invention is to utilize the mix mode IPD (inter-poly dielectric) structure that compatible with a HV CMOS transistor (high voltage complementary metal oxide semiconductor transistor) process, and also combined with a mirror layer to form a CMOS back plane of LCOS (liquid crystal on silicon) structure.

It is further object of this invention is to provide a HV transistor to drive the HV capacitor layer to obtain the large output operating voltage and better capacitance operating range.

It is still another object of this invention is to increase the output voltage to the mirror layer to obtain the best contrast and the output chrominance in per area unit.

In one embodiment, the LCOS back plane structure is according to the present invention include a HV CMOS transistor and a HV capacitor layer on the substrate, respectively. Herein, the HV capacitor layer can be located on the isolation structure, and the advantage of the HV capacitor layer on the isolation structure is that the area of the integrated circuit can be diminished while the capacitance achieves specific qualities. Then, an ILD (inter-layer dielectric) layer is located on the HV CMOS transistor and the HV capacitor layer. There are pluralities of contact 140 in the ILD layer which is used as a connector to electrically connect the multiple interconnect structure subsequently on the ILD layer and HV CMOS transistor and HV capacitor layer, respectively. Then, the multiple interconnect structure includes at least three metallization layer on the ILD layer. Herein, the top metallization layer of the multiple interconnect structure is a mirror layer which has highly reflective property, such that the HV CMOS transistor can generate a higher operating voltage to drive the oxide capacitor layer to increase the operating range output to the mirror layer. Furthermore, the dielectric constant of the HV capacitor layer is increased to raise the coupling ratio of the HV capacitor layer such that the HV capacitor layer can sustain the higher operating voltage to raise the capacitance operating range.

A method of forming the LCOS back plane structure according to the present invention may include forming a HV CMOS transistor and a HV capacitor layer on the substrate respectively. Then, an ILD layer is deposited on the HV CMOS transistor and HV capacitor layer. Next, a plurality of contact 140 formed in the ILD layer and a multiple interconnect structure is formed on the ILD layer by conventional interconnect technologies, and the multiple interconnect structure is electrically connected to the HV CMOS transistor and HV capacitor layer by the pluralities of contact, respectively, wherein the top metallization layer of the multiple interconnect structure is a aluminum layer that used as a mirror layer and has a highly reflective property to prevent the loss of the light scattering by a very flat surface of the mirror layer (the top metallization layer of the multiple interconnect structure), made of aluminum.

Other objects, advantages, and salient features of the invention will become apparent from the following detailed description taken in conjunction with the annexed drawings, which disclose preferred embodiments of the invention.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 7 is schematic representation of the structures at various stages during the formulation of a HV CMOS transistor on the substrate in accordance with a method disclosed herein;

FIG. 8 is schematic representation of the structures at various stages during the formulation of a inter-dielectric layer and a plurality of contact on the structure of the FIG. 7 in accordance with a method disclosed herein.

DESCRIPTION OF THE PREFERRED EMBODIMENT

Some sample embodiments of the invention will now be described in greater detail. Nevertheless, it should be recognized that the present invention can be practiced in a wide range of other embodiments besides those explicitly described, and the scope of the present invention is expressly not limited except as specified in the accompanying claims.

According to the preferable embodiment of the present invention, a HV (high voltage) device such as a HV CMOS transistor (high voltage complementary metal oxide semiconductor transistor) or a HV capacitor layer are applied to the substrate, such that the HV CMOS transistor can drive the HV capacitor layer during the high operating voltage process, wherein the coupling ratio of the HV capacitor layer is large than the prior oxide capacitor layer, such that the HV capacitor layer can sustain the higher operating voltage. Therefore, the operating voltage output to the mirror layer is increased and the capacitance operating range also can be raised. The HV device can sustain the higher operating voltage with the IPD (inter-poly dielectric) layer that can sustain the higher operating voltage such that better than the prior oxide capacitor layer which only sustain low operating voltage.

Figure 1:
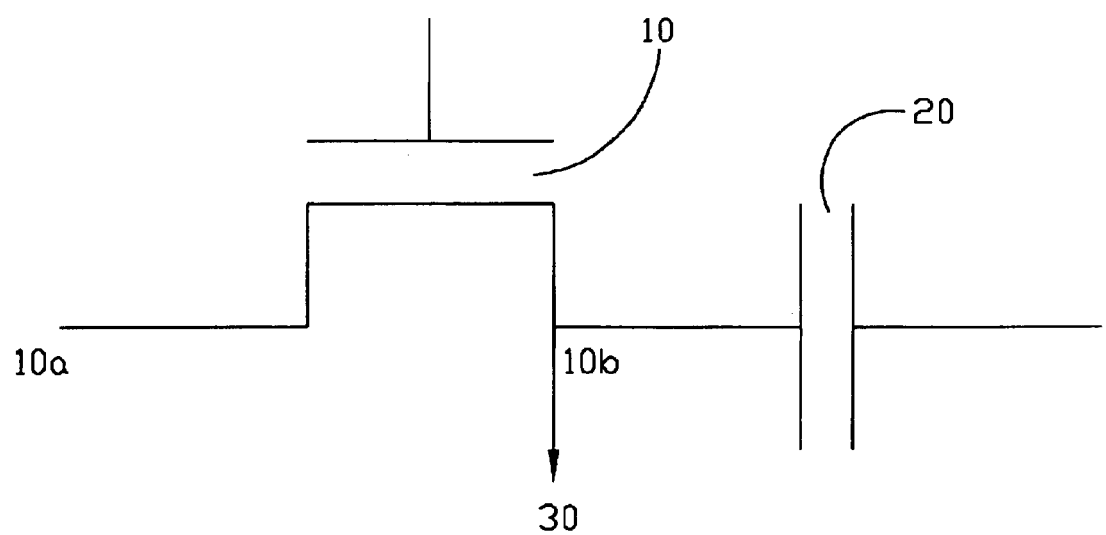
FIG. 1 is schematic representations of the HV devices applied to an equivalent circuit in accordance with a method disclosed herein.

FIG. 1 is a schematic representation of an equivalent circuit. According to the preferable embodiment of the present invention, a HV CMOS transistor (high voltage complementary metal oxide semiconductor transistor) 10, a HV capacitor layer 20, an output terminal 30, and a mirror layer structure (not shown in the FIG) are on the substrate, respectively. Wherein, the HV capacitor layer 20 can electrically connect to the drain region 10b of the HV CMOS transistor 10, and the output terminal 30 is also electrically connected to the drain region 10b of the HV CMOS transistor. The operating voltage of the mirror layer is controlled by HV CMOS transistor 10. In the preferable embodiment of the present invention, the operating voltage of the HV CMOS transistor is large than about 3.3 volt even increase to 12, 18, or large than the 18 volt.

Figure 2:
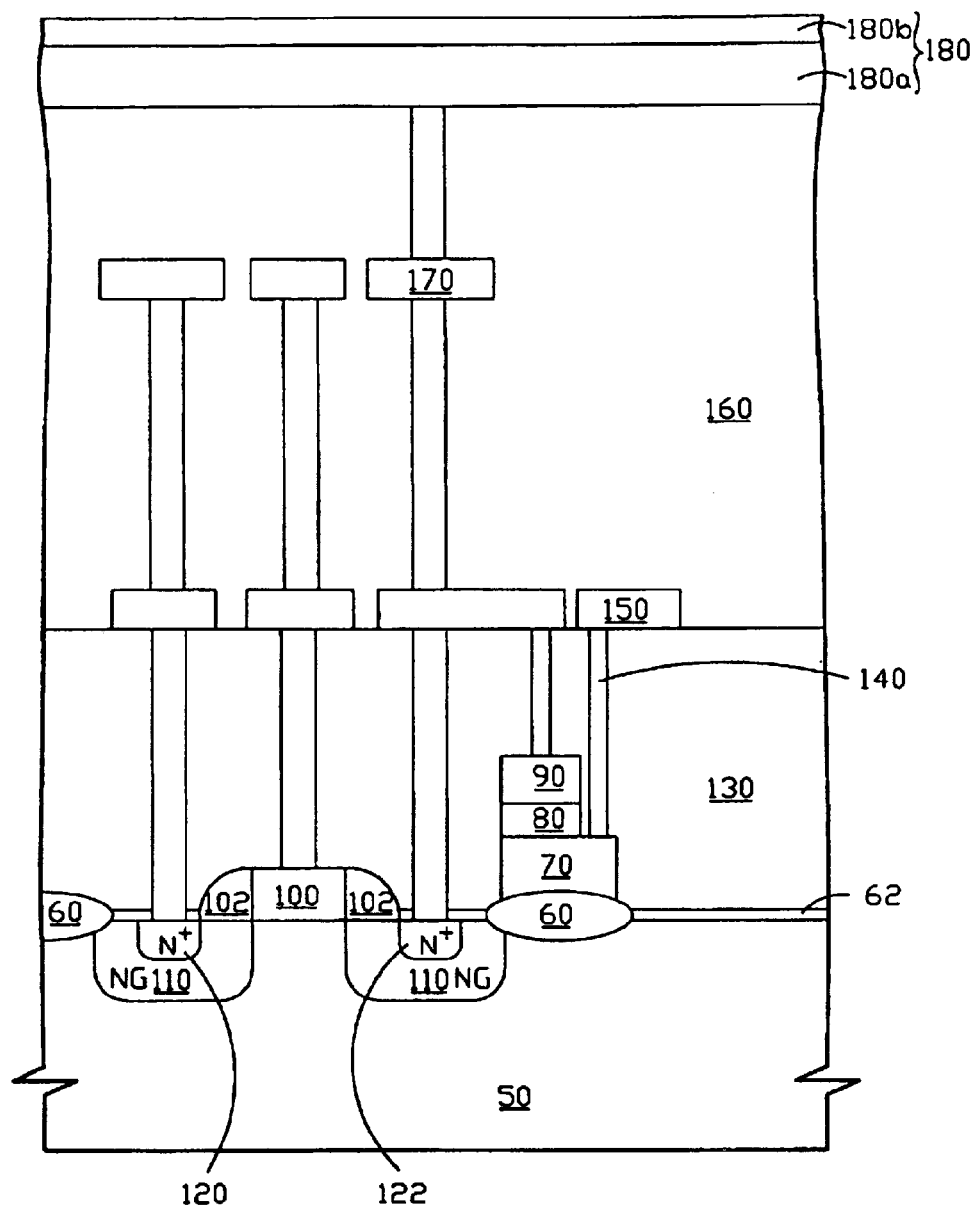
FIG. 2 is schematic representation of the HV devices on the substrate in accordance with a method disclosed herein.

In the FIG. 2 is showing a relationship between the each electric device on the substrate 50. A substrate 50 has an isolation structure 60 therein, and a HV CMOS transistor and a HV capacitor layer thereon, wherein the HV CMOS transistor and the HV capacitor layer are electrically separated on the substrate 50. In the preferable embodiment of the present invention, the structure of the HV CMOS transistor includes a gate 100 on the substrate 50, and a source region 120 which has first conductivity type and a drain region 122 which has second conductivity type in the substrate 50 respectively, wherein the first conductivity type and the second conductivity type is opposite, and the source region 120 and drain region 122 of the HV CMOS transistor are located in the two well regions 110, and the well regions has second conductivity type and the concentration is lower than the source region 120 and drain region 122.

Then, referring to FIG. 2, in the preferable embodiment of the present invention, the HV capacitor layer can be located on the substrate 50 or on the isolation structure 60. In the present invention, the HV capacitor layer is located on the isolation structure that can diminish the integrated circuit area. The structure of the HV capacitor layer includes a mix mode IPD layer (inter-poly dielectric) 80 sandwiched between two electrode plates 70 and 90. Then, an ILD layer (inter-layer dielectric) 130 is located on the HV CMOS transistor and the HV capacitor layer. The plurality of contact 140 within the ILD layer 130, wherein the pluralities of contact 140 is used as a connector to electrically connect the multiple interconnect structure and the HV CMOS transistor and HV capacitor layer respectively. Herein, the pluralities of contact 140 at least connected to the source region 120 and drain region 122 of the HV CMOS transistor, such that the source region 120 and drain region 122 can be electrically connected.

Similarly, the pluralities of contact 140 at least on the first electrode plate 70 of HV capacitor layer to connect the multiple interconnect structure and the HV capacitor layer. Therefore, the width for the structure of the HV capacitor layer such as IPD layer (inter-poly dielectric) 80 and the second electrode plate 90 is narrower than the first electrode plate 70 that is in order to let the plurality of contact 140 connects the first electrode plate 70 and multiple interconnect structure. Furthermore, the structure of multiple interconnect includes an IMD layer (inter-metal dielectric) 160, there are pluralities of contacts 140 within the IMD layer 160 to connect the multiple interconnect structure (includes three metallization layer 150, 170, and 180). Because the top metallization layer 180 of the multiple interconnects structure has higher reflective property that can serve as a mirror layer. Therefore, the top metallization layer (mirror layer) 180 can prevent the damage from the light scattering.

Then, referring to FIG. 3 to FIG. 9 is schematic representation that according to the preferable embodiment of the present invention is provided the steps of forming LCOS back plane structure. In the FIG. 3, a silicon dioxide is used as a pad oxide layer 56 that is formed on the substrate 50 by thermal oxidation method. Then, the pad oxide layer 56 is used as a mask to form an N-well region 52 in the substrate 50 by conventional ion implantation process. Thereafter, a nitride layer 58 is formed on the pad oxide layer 56 by conventional LPCVD method (low pressure chemical vapor deposition). Then, a photoresist layer (not shown in FIG. 3) is formed on the nitride layer 58 and used as a mask to define an active region (not shown in FIG. 3) on the substrate 50. Next, the portion of the nitride layer 58 and the pad oxide layer 56 are sequentially removed by etching process. Thereafter, a P-well region 54 and an N-well region 52 are formed in the substrate 50 by ion implement process respectively, wherein the P-well region 54 adjacent to the N-well region 52, and the conductivity type is opposite.

Figure 4:
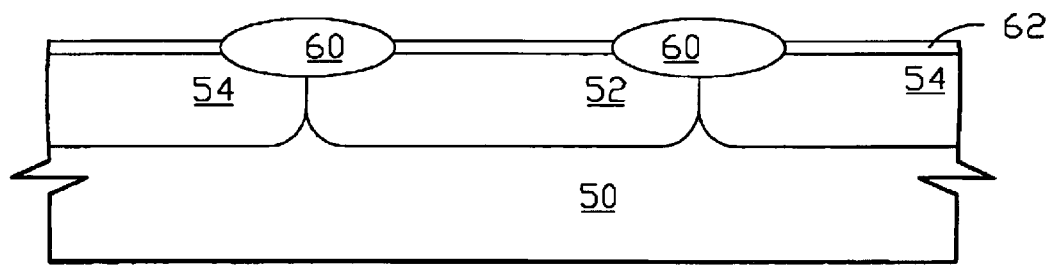
FIG. 4 is schematic representation of the field oxide region formed in the substrate in accordance with a method disclosed herein.

Then, referring to FIG. 4, an isolation structure 60 is formed in the substrate 50. The isolation structure 60 can be a field oxide region or a trench isolation structure. In the present invention, the field oxide region is used as an isolation structure 60 in the substrate 50. The field oxide region with thickness about 4500 angstrom, and is formed in the substrate 50 by thermal oxidation method.

Figure 5:
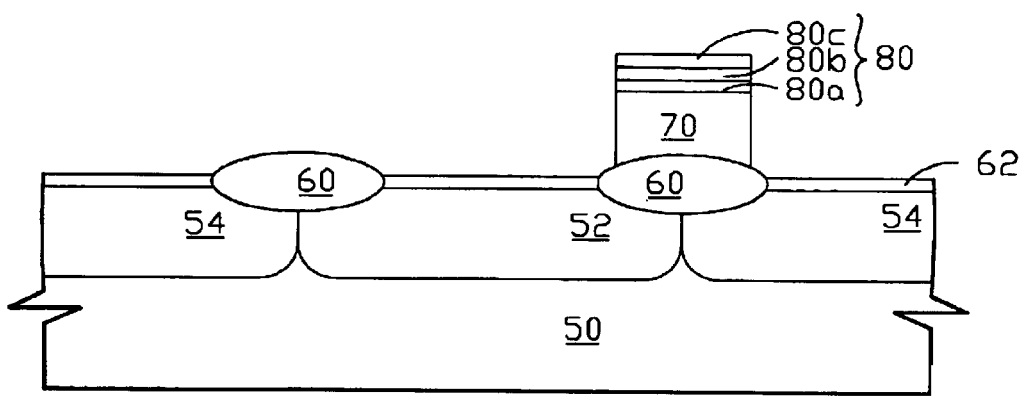
FIG. 5 is schematic representation of the structures at various stages during the formulation of a first electrode plate and an IPD layer on the substrate in accordance with a method disclosed herein.

Referring to FIG. 5, a polysilicon layer is deposited on the substrate 50. Next, a first oxide layer 80a of a mix mode IPD layer 80 is formed on the polysilicon layer and substrate 50 by polysilicon oxidation method. Thereafter, a nitride layer 80b of a mixed mode IPD layer 80 is deposited on the first oxide layer 80a, and the second oxide layer 80c of a mix mode IPD layer 80 is formed on the nitride layer 80b by silicon nitride oxidation method. Then, sequentially etching process is performed to the second oxide layer 80c, the nitride layer 80b, the first oxide layer 80a, and the polysilicon layer to form a first electrode plate 70 of HV capacitor layer on the field oxide region 60 and a mix mode IPD layer 80 on the first electrode layer 70.

Figure 6:
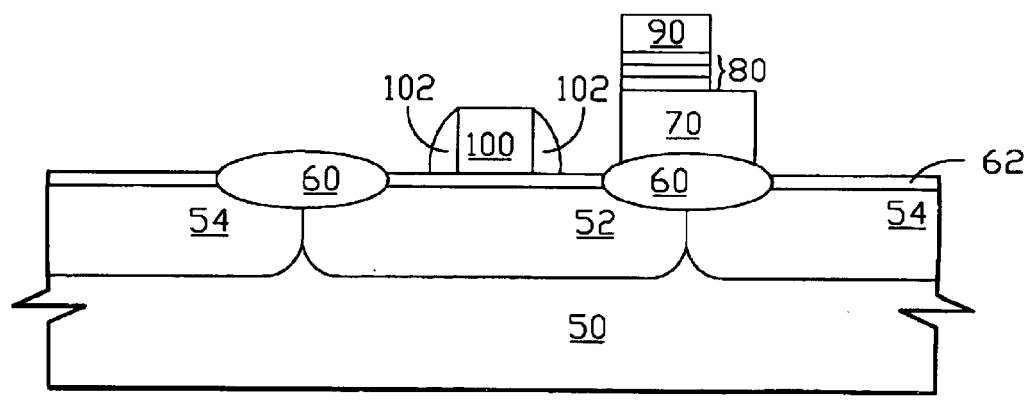
FIG. 6 is schematic representation of the structures at various stages during the formulation of a second electrode plate and a gate on the substrate in accordance with a method disclosed herein.

Next, referring to FIG. 6, a gate oxide layer 62 is formed on the substrate except on the mix mode IPD layer 80. Thereafter, a first polysilicon layer is deposited on the gate oxide layer 62 and on the mix mode IPD layer 80. Then, the first polysilicon layer is etched to form a second electrode plate 90 of the HV capacitor layer on the mix mode IPD layer 80 and a gate electrode 100 on the gate oxide layer 62. The embodiment of the present invention, in order to diminish the area of fabricating the integrated circuit, the HV capacitor layer is formed on the field oxide region 60. Moreover, in the structure of HV capacitor layer, the width of the second electrode plate 90 and mixed mode IPD layer 80 are narrower than the first electrode plate 70 such that the contact 140 (shown in the FIG. 7) can electrically connected to the first electrode plate 70 and multiple interconnect structure which is formed in subsequently process. Then, the two N-grade regions 110 are formed in the substrate 50 by ion implantation and below the gate electrode 100, wherein the N-grade region 110 has a second conductivity type.

Next, referring to FIG. 7, a spacer 102 is formed on sidewall of the gate electrode 100, and a source region 120 has a second and a drain region 122 has a second conductivity type are formed in the grade region by ion implantation, such that the HV CMOS transistor are constructed by the gate electrode 100, the source region 120, and drain region 122. The HV CMOS transistor adjacent to the isolation structure, and the doping concentration for the source region 120 and drain region 122 are higher than the grade region 110.

Next, referring to FIG. 8, an ILD layer 130 is deposited over the HV CMOS transistor, the isolation structure 60, and the HV capacitor layer. Then, a conductive layer (not shown in FIG. 8) is formed on the ILD layer 130. Thereafter, a photoresist layer with contact 140 patterns is formed on the conductive layer, and performing an etching process to etch the photoresist layer and the ILD layer 130 to form a plurality of contact 140 within the ILD layer 130. Then, a metal layer is deposited and filled with the plurality of contact 140 to form a plug in the ILD layer 130, wherein the material of metal layer can be tungsten.

Figure 9:
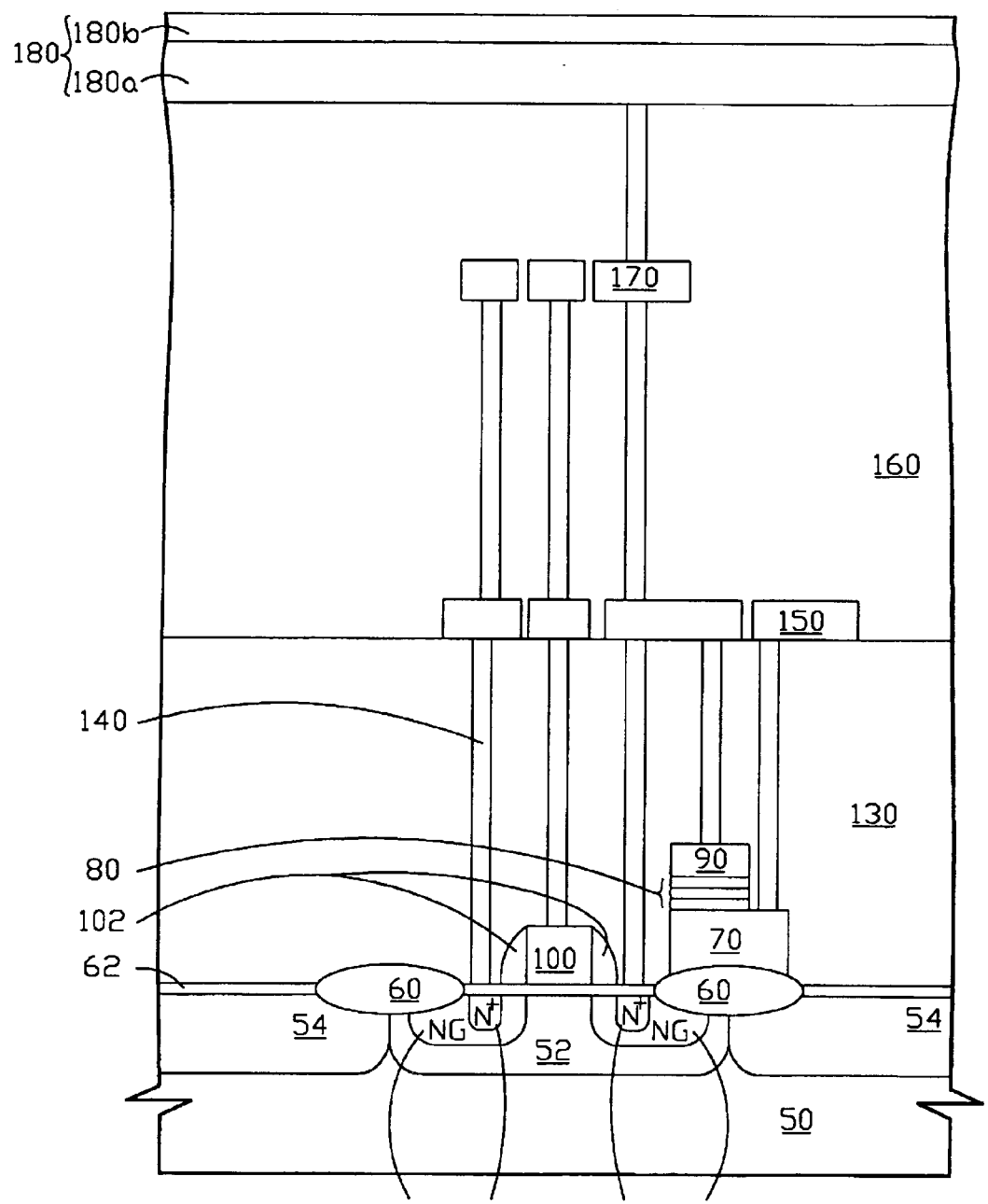
FIG. 9 is schematic representation of the structures at various stages during the formulation of a multiple interconnect structure on the structure of the FIG. 8 in accordance with a method disclosed herein.

Then, referring to FIG. 9, a multiple interconnect structure is formed on the conductive layer by conventional technologies. In the present invention, the multiple interconnect structure with at least three metallization layers 150, 170, and 180. The top metallization layer 180 includes an aluminum layer 180a and an enhancement layer 180b on the aluminum layer 180a, wherein the aluminum layer 180a has a higher reflective property, such that the aluminum layer 180a can sever as a mirror layer. The reason for aluminum layer 180a as a mirror layer is that prevents the loss of light by scattering from a very flat surface of the mirror layer.

According to abovementioned, we can achieve the advantages as following:

Firstly, according to the structure of the FIG. 2, the HV capacitor layer is driven by the HV CMOS transistor during the higher operating voltage process and further due to the HV capacitor with higher coupling ratio to sustain the higher operating voltage such that the output voltage range to the mirror layer can be increased. For higher output operating voltage and better capacitance operating range, the contrast and the chrominance output range of the LCOS back plane structure device could be increased in per area unit. Therefore, the issue for the limitation of the LV CMOS transistor (low voltage complementary metal oxide semiconductor transistor) that the operating voltages range (such as 1 volt to 5 volt) can be improved.

Figure 3:
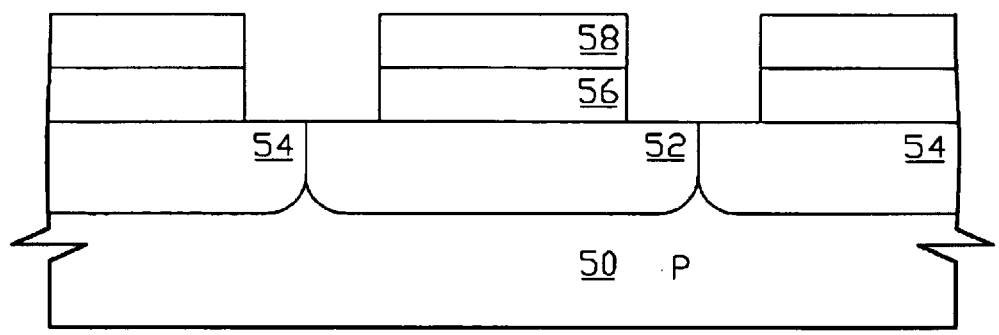
FIG. 3 is schematic representation of structures at various stages during the formulation of a silicon dioxide layer, a nitride layer, an n-well region, and a p-well region in the substrate in accordance with a method disclosed herein.

Secondly, according to the steps for forming the LCOS back plane structure of the FIG. 3 to FIG. 5, the IPD layer has higher dielectric constant and coupling ratio, and the middle layer (nitride layer) can store a large of charge in the middle layer, such that the capacitance capability of capacitor layer can be raised. Furthermore, in order to diminish the area of the integrated circuit, the IPD layer is constructed on the isolation structure. Therefore, the IPD layer can improve that the issue for the raising the capacitance to increase the area the oxide capacitor layer.

Thirdly, according to the FIG. 6 to FIG. 9, in the fabrication of the HV CMOS transistor process, the HV CMOS transistor is combined with a mirror layer that has a higher reflective property to widely increase the output contrast and chrominance.

Although specific embodiments have been illustrated and described, it will be obvious to those skilled in the art that various modifications may be made without departing from what is intended to be limited solely by the appended claims.

What is claimed is:

1. A liquid crystal on silicon structure, said liquid crystal on silicon structure comprising:

a high voltage metal oxide semiconductor transistor;

a high voltage capacitor layer, said high voltage capacitor layer electrically coupling with a drain region of said high voltage metal oxide semiconductor transistor;

an output terminal, said output terminal electrically coupling said drain region of said high voltage metal oxide semiconductor transistor; and a mirror layer, said mirror layer is electrically coupled to said output terminal, wherein the operating voltage of said semiconductor layer is controlled by high voltage metal oxide semiconductor transistor.

2. The liquid crystal on silicon structure according to claim 1, wherein said high voltage capacitor layer is a gate oxide capacitor.

3. The liquid crystal on silicon structure according to claim 1, wherein the material of said high voltage capacitor layer is an inter-poly dielectric layer.

4. The liquid crystal on silicon structure according to claim 3, wherein the structure of said inter-poly dielectric layer is an oxide/nitride/oxide layer.

5. A liquid crystal on silicon structure, said liquid crystal on silicon structure comprising:

a semiconductor substrate having a first conductivity;

a complementary metal oxide semiconductor transistor on said semiconductor substrate;

a capacitor over an isolation structure of said semiconductor substrate and electrically separated to said complementary metal oxide semiconductor transistor, wherein said isolation structure is adjacent said complementary metal oxide semiconductor transistor;

an interconnect structure on said complementary metal oxide semiconductor transistor and said capacitor layer, such that said complementary metal oxide semiconductor transistor is electrically coupled to said capacitor layer; and a mirror layer being a top metallization layer of said interconnect structure and electrically coupling to said interconnect structure.

6. The liquid crystal on silicon structure according to claim 5, wherein said complementary metal oxide semiconductor transistor is a high voltage complementary metal oxide semiconductor transistor.

7. The liquid crystal on silicon structure according to claim 6, wherein said high voltage complementary metal oxide semiconductor transistor having a gate on said semiconductor substrate, and a source region having a second conductivity and a drain region having said second conductivity in said semiconductor substrate, said second conductivity opposite to said first conductivity, wherein said source region and said drain region in concentration of two well regions having said second conductivity is less than said source region and said drain region.

8. The liquid crystal on silicon structure according to claim 5, wherein said capacitor layer is a high voltage capacitor.

9. The liquid crystal on silicon structure according to claim 8, wherein said high voltage capacitor layer is a gate oxide capacitor.

10. The liquid crystal on silicon structure according to claim 8, wherein the structure of said high voltage capacitor layer is an inter-poly dielectric layer.

11. The liquid crystal on silicon structure according to claim 10, wherein the structure of said inter-poly dielectric is an oxide/nitride/oxide layer.

12. A mix mode liquid crystal on silicon structure, said mix mode liquid crystal on silicon structure comprising:

a semiconductor substrate having a first conductivity;

a complementary metal oxide semiconductor transistor having a gate on said semiconductor substrate, and a source region having a second conductivity and a drain region having said second conductivity in said semiconductor substrate, said second conductivity opposite to said first conductivity, wherein the concentration of said source region and said drain region in two well regions having said second conductivity is less than said source region and said drain region;

an isolation structure in said semiconductor substrate and adjacent to said complementary metal oxide semiconductor transistor;

a capacitor layer on said isolation structure;

an inter-layer dielectric layer over said complementary metal oxide semiconductor transistor and said capacitor layer;

a plurality of contacts in said inter-layer dielectric layer and electrically coupling to said drain region and said source region of said complementary metal oxide semiconductor transistor, such that said source region is electrically coupled to said drain region an interconnect structure electrically coupled to said complementary metal oxide semiconductor transistor and said capacitor respectively, wherein said interconnect structure is on said inter-layer dielectric layer.

13. The mix mode liquid crystal on silicon structure according to claim 12, wherein said isolation is a field oxide region.

14. The mix mode liquid crystal on silicon structure according to claim 12, wherein said capacitor layer is a high voltage capacitor.

15. The mix mode liquid crystal on silicon structure according to claim 12, wherein said capacitor layer comprises a first electrode plate.

16. The mix mode liquid crystal on silicon structure according to claim 15, further comprising an inter-poly dielectric layer on said first electrode plate.

17. The mix mode liquid crystal on silicon structure according to claim 16, wherein the structure of said inter-poly dielectric layer is an oxide/nitride/oxide layer.

18. The mix mode liquid crystal on silicon structure according to claim 16, further comprising a second electrode plate on said inter-poly dielectric layer.

19. The liquid crystal on silicon structure according to claim 18, wherein the width of said second electrode plate is smaller than said first electrode plate.

20. The liquid crystal on silicon structure according to claim 16, wherein the width of said inter-poly dielectric layer is smaller than said first electrode plate.

21. The mix mode liquid crystal on silicon structure according to claim 12, wherein a top metallization layer of said interconnect structure is an aluminum layer.

22. The mix mode liquid crystal on silicon structure according to claim 21, further comprising an enhancement layer on said aluminum layer.

23. A method for forming a mix mode liquid crystal on silicon back plane, said method comprising:

providing a semiconductor substrate having a first conductivity;

forming an isolation structure on and in said semiconductor substrate;

forming a first electrode plate of a capacitor on said isolation structure;

sequentially forming a first oxide layer on said first electrode plate, a nitride layer on said first oxide layer, and a second oxide layer on said nitride layer;

forming a gate oxide layer on said semiconductor substrate except for said second oxide layer, said nitride layer, said first oxide layer, and said first electrode plate;

depositing a polysilicon layer on said semiconductor substrate and said second oxide layer;

etching said polysilicon layer to form a gate on said semiconductor substrate and a second electrode plate on said second oxide layer;

forming two well regions having a second conductivity in said semiconductor substrate, said two well regions located adjacent said gate, wherein said second conductivity opposite to said first conductivity;

forming a source region having a second conductivity, a drain region having said second conductivity in said two well regions, such that said source region, said drain region, and said gate form a complementary metal oxide semiconductor transistor and having an operating voltage, and said complementary metal oxide semiconductor transistor located adjacent to said isolation structure, wherein the concentration of said source region and said drain region is higher than said two well regions;

forming an inter-layer dielectric on said semiconductor substrate, said complementary metal oxide semiconductor transistor, said isolation structure, and said capacitor;

forming a plurality of contacts in said inter-layer dielectric layer, and which is electrically coupled to said source region, said drain region, said gate, said first electrode plate, and said second electrode plate of said capacitor; and forming a conductivity layer on said inter-layer dielectric layer.

24. The method according to claim 23, wherein said isolation structure is a field oxide region.

25. The method according to claim 24, wherein forming said field oxide region comprises a thermal oxidation method.

26. The method according to claim 23, wherein the voltage of said operating voltage is about higher than 3.3 volts.

27. The method according to claim 23, further comprising forming an interconnect structure on said conductivity layer.

28. The method according to claim 27, wherein a top layer of said interconnect structure is a mirror layer.

29. A method for fabricating a mix mode liquid crystal on silicon back plane, said method comprising:

providing a semiconductor substrate having a first conductivity;

forming an isolation structure in or on said semiconductor substrate;

forming a first electrode plate of a capacitor over said isolation structure;

sequentially forming a first oxide layer on said first electrode plate, a nitride layer on said first oxide layer, and a second oxide layer on said nitride layer;

forming a gate oxide layer on said semiconductor substrate except for said second oxide layer, said nitride layer, said first oxide layer, and said first electrode plate;

depositing a polysilicon layer on said semiconductor substrate and on said second oxide layer;

etching said polysilicon layer and portion of said second oxide layer, said nitride layer, and said first oxide layer to form a gate on said semiconductor substrate and a second electrode plate on said second oxide layer, and the width of said second electrode plate and said second oxide layer, said nitride layer, and said first oxide layer being less than said first electrode plate;

performing an ion implantation process to form two well regions having a second conductivity in said semiconductor substrate, said two well regions located adjacent to side of said gate oxide, wherein said second conductivity opposite to said first conductivity;

ion implanting a source region having said second conductivity, a drain region having said second conductivity in said semiconductor substrate, such that said source region, said drain region, and said gate form a complementary metal oxide semiconductor transistor having an operating voltage, and said complementary metal oxide semiconductor transistor being located adjacent said isolation structure, wherein the concentration of said source region and said drain region is higher than said two well regions;

depositing an inter-layer dielectric layer on said semiconductor substrate, said complementary metal oxide semiconductor transistor, said isolation structure, and said capacitor layer;

forming a plurality of contact in said inter-layer dielectric layer and electrically coupling said source region, said drain region, and said gate of said complementary metal oxide semiconductor transistor, said first electrode plate and said second electrode plate of said capacitor layer, wherein said plurality of contacts are at least on said first electrode plate;

forming a conductivity layer on said inter-layer dielectric layer; and forming an interconnect structure on said conductivity layer.

30. The method according to claim 29, wherein said operating voltage is higher than about 3.3 volts.

31. The method according to claim 29, wherein a top layer of said interconnect structure is a mirror layer.

32. The method according to claim 31, wherein said top layer of interconnect structure is an aluminum layer.

33. The method according to claim 32, further comprising an enhancement layer on said aluminum layer.

* * * * *